US011277024B2

(12) United States Patent
Wang et al.

(10) Patent No.: US 11,277,024 B2
(45) Date of Patent: Mar. 15, 2022

(54) DEVICES, SYSTEMS, AND METHODS FOR REDUCING STANDBY POWER CONSUMPTION

(71) Applicant: ZQ Power, LLC, Denver, CO (US)

(72) Inventors: Calvin Shiening Wang, City of Industry, CA (US); Zhen-Qiu Huang, Diamond Bar, CA (US)

(73) Assignee: ZQ Power, LLC, Denver, CO (US)

( * ) Notice: Subject to any disclaimer, the term of this patent is extended or adjusted under 35 U.S.C. 154(b) by 0 days.

(21) Appl. No.: 16/938,115

(22) Filed: Jul. 24, 2020

(65) Prior Publication Data

US 2022/0029451 A1 Jan. 27, 2022

(51) Int. Cl.
*H02J 9/00* (2006.01)
*H02M 1/00* (2006.01)

(52) U.S. Cl.
CPC ........... *H02J 9/007* (2020.01); *H02M 1/0032* (2021.05)

(58) Field of Classification Search
CPC ......... H02J 9/005; H02J 9/007; H02M 1/0032
USPC ........................................................ 307/126
See application file for complete search history.

(56) References Cited

U.S. PATENT DOCUMENTS

| 3,596,158 | A | 7/1971 | Watrous |
| 5,107,685 | A | 4/1992 | Kobayashi |
| 5,270,576 | A | 12/1993 | Kahle |
| 5,399,948 | A | 3/1995 | Yang |
| 5,424,903 | A | 6/1995 | Schreiber |
| 6,292,233 | B1 | 9/2001 | Erba et al. |
| 6,489,725 | B1 | 12/2002 | Suzuki et al. |
| 6,947,296 | B2 | 9/2005 | Hirosawa |
| 7,765,416 | B2 | 7/2010 | Zhou et al. |
| 7,800,251 | B2 | 9/2010 | Hodges et al. |
| 7,830,041 | B2 | 11/2010 | Yang et al. |
| 7,944,086 | B2 | 5/2011 | Hodges et al. |
| 8,531,061 | B2 | 9/2013 | Lim |
| 8,854,838 | B2 | 10/2014 | Hara et al. |
| 9,185,753 | B2 | 11/2015 | Igaki et al. |
| 9,318,912 | B2 | 4/2016 | Baarman et al. |
| 2004/0052092 | A1 | 3/2004 | Hirosawa |
| 2007/0217237 | A1 | 9/2007 | Salvestrini |
| 2008/0164768 | A1 | 7/2008 | Litwack |
| 2008/0309164 | A1 | 12/2008 | Lim |
| 2009/0072813 | A1 | 3/2009 | Banhegyesi |
| 2009/0184705 | A1 | 7/2009 | Yoshizawa |
| 2009/0185402 | A1 | 7/2009 | Lam et al. |
| 2009/0322159 | A1 | 12/2009 | DuBose et al. |
| 2010/0013409 | A1 | 1/2010 | Quek et al. |
| 2010/0148591 | A1 | 6/2010 | Lim |
| 2010/0225251 | A1 | 9/2010 | Maruyama |
| 2010/0321032 | A1 | 12/2010 | Holce et al. |

(Continued)

FOREIGN PATENT DOCUMENTS

TW 200947197 11/2009

*Primary Examiner* — Hal Kaplan
(74) *Attorney, Agent, or Firm* — Sheridan Ross P.C.

(57) ABSTRACT

A standby circuit includes a power regulator configured to operate in an ON state and an OFF state; a power detecting circuit configured to detect power of a load; an integrated circuit module including two interfaces, each of the two interfaces configured to receive an ON operating command or an OFF operating command from a remote control device; and a proximity detection circuit configured to determine a proximity of each of the two interfaces to the remote control device.

20 Claims, 8 Drawing Sheets

(56) References Cited

U.S. PATENT DOCUMENTS

| | | |
|---|---|---|
| 2010/0327773 A1 | 12/2010 | Gu et al. |
| 2011/0302433 A1 | 12/2011 | Liu |
| 2012/0139348 A1 | 6/2012 | DuBose |
| 2012/0201062 A1 | 8/2012 | Lee |
| 2012/0230073 A1 | 9/2012 | Newman, Jr. et al. |
| 2013/0038143 A1 | 2/2013 | Koanantakool et al. |
| 2013/0258731 A1 | 10/2013 | Xu et al. |
| 2014/0160820 A1 | 6/2014 | McKinley |
| 2014/0184191 A1 | 7/2014 | Huang et al. |
| 2017/0324270 A1 * | 11/2017 | Wang .................... H01R 24/76 |

* cited by examiner

DEVICES, SYSTEMS, AND METHODS FOR REDUCING STANDBY POWER CONSUMPTION

FIELD OF DISCLOSURE

The present disclosure relates generally to devices, systems, and methods for reducing standby power consumption. More specifically, the present invention relates to devices, systems, and methods that allow an appliance or similar load to be completely turned OFF when not in use.

BACKGROUND

Electronic appliances, including by way of example televisions, monitors, portable air conditioning units, electric fans, and other electronic devices, are ubiquitous. Many appliances are provided with a remote control. The remote control communicates with the appliance via infrared, Bluetooth, or another wireless communication protocol. Using the remote control, the appliances can be "turned ON and OFF".

However, so that the appliance can detect and respond to an "ON" signal when in the "OFF" state, many remotely controllable appliances do not turn completely OFF (e.g., do not enter a state in which they are drawing no electricity whatsoever). In other words, when such an appliance is "turned OFF," the appliance enters a "STANDBY" mode, in which it continues to draw power—generally between 1 and 3 Watts. Although this power usage may be significantly lower than when the device is in an operating mode, and may have a negligible effect on the overall power consumption of a single household, the combined effect across a given area (e.g. a neighborhood, a city, a country) of thousands, hundreds of thousands, or even millions of devices each drawing 1-3 Watts in the STANDBY mode is considerable.

U.S. patent application Ser. No. 14/140,551, entitled "System and Device for Reducing Standby Power Consumption," filed Dec. 26, 2013 and having a priority date of Dec. 26, 2012, as well as U.S. patent application Ser. No. 15/629,717, entitled "Standby Circuit, and Outlet, Plug, and Device Having the Same," filed Jun. 21, 2017 as a continuation-in-part of U.S. patent application Ser. No. 14/140,551, describe some systems and devices for reducing standby power consumption.

U.S. Pat. No. 8,854,838 to Hara discloses a power supply control device for controlling a power supply that provides power to a load circuit. The power supply control device draws power from the power supply when the power supply is in an ON state (and providing power to the load circuit), and from a power storage unit when the power supply is in an OFF state (and not providing power to the load circuit). The control device intermittently turns on the power supply to recharge the power storage unit.

U.S. Pat. No. 7,944,086 to Hodges discloses an energy saving device that determines when a load is in an OFF or inactive state and intermittently cycles power to the load, such as for 400 milliseconds every 2 seconds. When power is cycled to the load, a determination is made as to whether the load is desired to be in the on state, in which case power to the load is maintained. If the load is not desired to be in the on state, then the cycling continues.

U.S. Pat. No. 7,765,416 to Zhou discloses a power supply control device that includes a signal induction circuit. When a STANDBY command is received via the signal induction circuit, the device turns OFF an associated power supply. While the power supply is OFF, the signal induction circuit is powered by a battery.

U.S. Patent Application Publication No. 2012/0201062 to Lee discloses a device comprising multiple outlets and that detects power ON/OFF control data sent by a remote control and corresponding to an electrical appliance plugged into one of the multiple outlets. When power OFF control data is received, the device cuts OFF power to the electrical appliance, and when power ON control data is received, the device restores power to the electrical appliance (thus enabling the electrical appliance to operate in STAND-BY mode) and then sends the power-ON control data to the electrical appliance to enable switching from the STAND-BY mode to the operating mode.

U.S. Patent Application Publication No. 2010/0148591 to Lim discloses a plug for an electrical product having embedded therein a plug control circuit unit that selectively blocks power flow to the plug from an outlet into which the plug has been inserted. The control circuit unit includes a wireless unit for receiving wireless plug control signals from a remote control. The remote control may be used to selectively control a plurality of plug control circuit units U.S. Patent Application Publication No. 2009/0322159 to DuBose discloses a wall outlet that determines when a device connected thereto is an idle or standby mode and disengages the outlet from a power input.

U.S. Pat. No. 5,270,576 to Kahle discloses an electrical connector network that comprises a control outlet and a slave outlet that is selectively connectable to the control outlet. The network includes additional components that enable multiple electrical appliances connected to the network to be coordinately controlled, such that when one appliance is turned ON, the other appliances turn on, and when one appliance is turned OFF, the other appliances turn OFF.

SUMMARY

The present disclosure describes innovative devices, systems, and methods for reducing standby power consumption. Implementation of these devices, systems, and methods can result in significant energy savings.

Example aspects of the present disclosure include:

A standby circuit, comprising: a power regulator configured to operate in an ON state and an OFF state; a power detecting circuit configured to detect power of a load; an integrated circuit module including two interfaces, each of the two interfaces configured to receive an ON operating command or an OFF operating command from a remote control device; and a proximity detection circuit configured to determine a proximity of each of the two interfaces to the remote control device, wherein the integrated circuit module determines a priority between the two interfaces based on the proximity of each of the two interfaces to the remote control device, such that the integrated circuit module receives the ON operating command or the OFF operating command through one of the two interfaces that is closer to the remote control device than the other of the two interfaces, and wherein the integrated circuit module determines an operating mode of the load according to the power output by the power detecting circuit and outputs an OFF control signal to the power regulator to switch the power regulator into the OFF state in response to the power of the load being within a predetermined range.

Any of the aspects herein, wherein when the integrated circuit module receives the OFF operating command, the integrated circuit module determines the operating mode of the load based on the power, wherein when the load is in the operating mode, the integrated circuit module delays a first predetermined period of time to output the OFF control signal to the power regulator, wherein when the load is in a STANDBY operating mode, the integrated circuit module outputs the OFF control signal to the power regulator, and wherein when the integrated circuit module receives the ON operating command, the integrated circuit module outputs an ON control signal to the power regulator and the power regulator operates in the ON state.

Any of the aspects herein, wherein when the integrated circuit module receives the OFF operating command, the integrated circuit module outputs the OFF control signal and operates in a SLEEP mode and wherein when the integrated circuit module receives the ON operating command, the integrated circuit outputs the ON control signal and operates in a WAKE-UP mode.

Any of the aspects herein, wherein the integrated circuit module delays a second predetermined period of time to determine whether the power of the load is larger than an upper bound of the predetermined range when outputting the ON control signal to the power regulator and when the power of the load is less than the upper bound of the predetermined range, the integrated circuit module outputs a warning signal.

Any of the aspects herein, wherein the proximity detection circuit includes at least one of a radio proximity detection device, a global positioning satellite (GPS) proximity detection device, a cellular triangulation proximity detection device, and a wireless triangulation proximity detection device.

Any of the aspects herein, wherein types of the remote control device include a smartphone, a tablet computer, a personal digital assistant, a smart watch, smart glasses, a laptop computer, a notebook computer or a cellular telephone.

Any of the aspects herein, wherein the priority between the two interfaces also includes comparing the types of the remote control device.

Any of the aspects herein, wherein one of the two interfaces connects an internal receive module and the other of the two interfaces connects an external receive module.

Any of the aspects herein, wherein the integrated circuit module further comprises a third interface, wherein the third interface is connected to an internal send module and wherein the integrated circuit module delays sending a signal through the third interface to a remote commander operating the load.

Any of the aspects herein, wherein the load also receives the OFF operating command from the remote control device.

Any of the aspects herein, further comprising a power source separate from a power source of the load used to provide power to the integrated circuit module.

Any of the aspects herein, wherein the standby circuit is provided along an electrical wiring connected to the load.

A standby outlet, comprising: a connecting portion; and at least one socket unit configured to be coupled to the connecting portion. The at least one socket unit includes: a plurality of conductors; a socket; and a standby circuit. The standby circuit includes: a power regulator configured to operate in an ON state and an OFF state; a power detecting circuit configured to detect power of a load; an integrated circuit module including two interfaces, each of the two interfaces configured to receive an ON operating command or an OFF operating command from a remote control device; and a proximity detection circuit configured to determine a proximity of each of the two interfaces to the remote control device, wherein the integrated circuit module determines a priority between the two interfaces based on the proximity of each of the two interfaces to the remote control device, such that the integrated circuit module receives the ON operating command or the OFF operating command through one of the two interfaces that is closer to the remote control device than the other of the two interfaces, and wherein the integrated circuit module determines an operating mode of the load according to the power output by the power detecting circuit and outputs an OFF control signal to the power regulator to switch the power regulator into the OFF state in response to the power of the load being within a predetermined range.

Any of the aspects herein, wherein the plurality of conductors are coupled to the connecting portion, wherein the standby circuit is arranged between the connecting portion and the plurality of conductors and wherein the power detecting circuit detects the power of the load through the plurality of conductors.

Any of the aspects herein, wherein the proximity detection circuit includes at least one of a radio proximity detection device, a global positioning satellite (GPS) proximity detection device, a cellular triangulation proximity detection device, and a wireless triangulation proximity detection device.

Any of the aspects herein, wherein types of the remote control device include a smartphone, a tablet computer, a personal digital assistant, a smart watch, smart glasses, a laptop computer, a notebook computer or a cellular telephone.

A standby plug, comprising: a plurality of terminals; and a standby circuit. The standby circuit includes: a power regulator configured to operate in an ON state and an OFF state; a power detecting circuit configured to detect power of a load; an integrated circuit module including two interfaces, each of the two interfaces configured to receive an ON operating command or an OFF operating command from a remote control device; and a proximity detection circuit configured to determine a proximity of each of the two interfaces to the remote control device, wherein the integrated circuit module determines a priority between the two interfaces based on the proximity of each of the two interfaces to the remote control device, such that the integrated circuit module receives the ON operating command or the OFF operating command through one of the two interfaces that is closer to the remote control device than the other of the two interfaces, and wherein the integrated circuit module determines an operating mode of the load according to the power output by the power detecting circuit and outputs an OFF control signal to the power regulator to switch the power regulator into the OFF state in response to the power of the load being within a predetermined range.

Any of the aspects herein, wherein the plurality of terminals are coupled between an alternating current (AC) power source and the load and wherein the power detecting circuit detects the power of the load through the plurality of terminals.

Any of the aspects herein, wherein the plurality of conductors are coupled to the connecting portion, wherein the standby circuit is arranged between the connection portion and the plurality of conductors and wherein the power detecting circuit detects the power of the load through the plurality of conductors.

Any of the aspects herein, wherein the proximity detection circuit includes at least one of a radio proximity detection device, a global positioning satellite (GPS) proximity detection device, a cellular triangulation proximity detection device, and a wireless triangulation proximity detection device.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
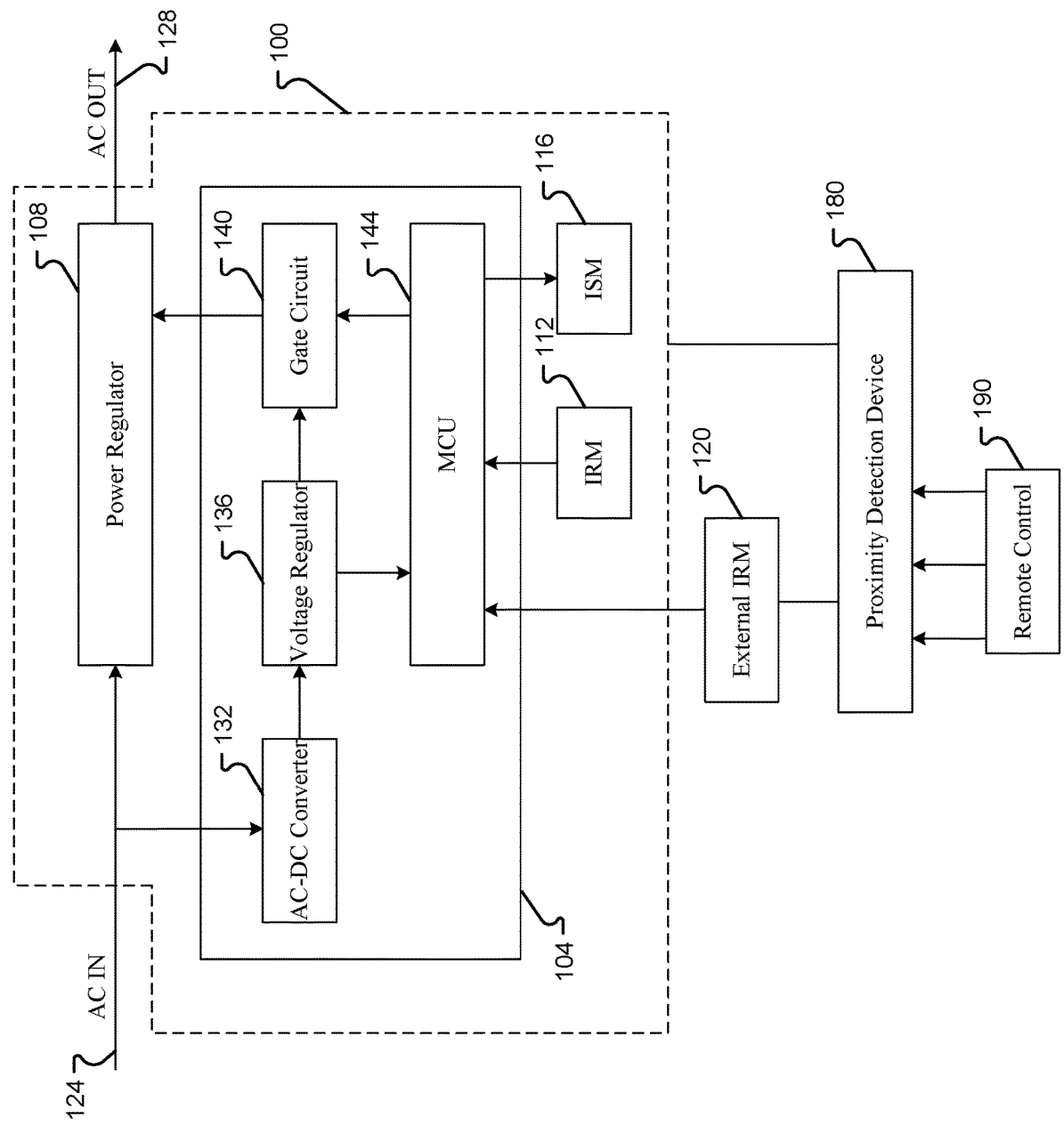
FIG. 1 is a block diagram of a standby circuit according to embodiments of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The use of "substantially" in the present disclosure, when referring to a measurable quantity (e.g., a diameter or other distance) and used for purposes of comparison, is intended to mean within 5% of the comparative quantity. The terms "substantially similar to," "substantially the same as," and "substantially equal to," as used herein, should be interpreted as if explicitly reciting and encompassing the special case in which the items of comparison are "similar to," "the same as" and "equal to," respectively.

FIG. 1 illustrates a standby circuit 100 according to embodiments of the present disclosure. The standby circuit 100 comprises a thick film hybrid integrated circuit (HIC) module 104, a power regulator 108, an infrared receive module (IRM) 112, and an infrared send module (ISM) 116. The standby circuit 100 is operably connected to an external infrared receive module 120 as well. The standby circuit 100 is connected to an AC In line 124, and controls power flow through an AC Out line 128 that is in turn connected to a load (not shown in FIG. 1). The load may be, for example, a television, a monitor, a projector, an air conditioning unit, an audio system, an electronic fan, a remotely controlled light, a printer, a copier, or any other electrical appliance or electronic device that may be switched ON and OFF and/or that is controlled by a remote control 190.

The HIC module 104 comprises an AC-DC converter 132, a voltage regulator 136, a gate circuit 140, and a microcontroller unit (MCU) 144. In some embodiments, the HIC module 104 may be an integrated circuit other than a thick film hybrid integrated circuit.

The AC-DC converter 132 receives incoming alternating current (AC) power from the AC In line 124, converts the AC power to direct current (DC) power, and transmits the DC power to the voltage regulator 136. The AC-DC converter 132 may be or comprise a rectifier circuit and/or a power isolation circuit. The AC-DC converter 132 is connected directly to the AC In line 124 rather than the AC Out line 128, the AC-DC converter 132 beneficially powers the HIC module 104 even when the power regulator 108 is in an open or OFF position.

The voltage regulator 136 receives DC power from the AC-DC converter 132, corrects any undesirable voltage fluctuations, and provides a stabilized voltage to the gate circuit 140 and the MCU 144. The voltage regulator 136 thus protects the gate circuit 140 and the MCU 144 against over voltage, under voltage, and other voltage surges. The voltage regulator 136 may be or comprise a voltage stabilizer circuit, a linear regulator, and/or a switching regulator. The voltage regulator 136 may be implemented as an integrated circuit. The voltage regulator 136 may comprise one or more transistors and/or one or more operational amplifiers.

The gate circuit 140 receives DC power from the voltage regulator 136 and control signals from the MCU 144. The gate circuit 140 acts as a switch control component that, based on a control signal received from the MCU 144, triggers switching of the power regulator 108 from an ON or closed state to an OFF or open state, or vice versa. In some embodiments, the gate circuit 140 may be a zero-cross optoisolator TRIAC.

The MCU 144 evaluates information received from the IRM 112 and/or the external IRM 120 and, based on the results of that evaluation, transmits control signals to the gate circuit 140 that cause the gate circuit 140 to switch the power regulator 108 from an ON or closed position to an OFF or open position, or vice versa. The MCU 144 also controls the ISM 116.

For example, if the standby circuit 100 is configured to control power flow to a television, then while the television is ON, the MCU 144 may receive, via either or both of the IRM 112 and the external IRM 120, an OFF signal from a remote control 190 operated by a user of the television, indicating that the user wishes to turn OFF the television. The television may or may not also receive the OFF signal from the remote control 190. If the television does receive the signal, the television may switch from an ON state to a STANDBY state, in which the television is still consuming several watts of power. Regardless, upon receipt of the OFF signal, the MCU 144 may send a control signal to the gate circuit 140 that, in turn, causes the gate circuit 140 to switch the power regulator 108 from an ON or closed position to an OFF or open position, thus cutting off the flow of power to the television. If the television was still in the ON state, cutting off power to the television has the effect of turning OFF the television, such that the television consumes no power. If the television had already switched from an ON state to a STANDBY state, then cutting off the flow of power to the television again has the effect of completely turning OFF the television, such that the television consumes no power.

As another example, if the television is already in an OFF state, the MCU 144 may receive, via the IRM 112 and/or the external IRM 120, an ON signal from a remote control 190 operated by a user of the television, indicating that the user wishes to turn ON the television. Because no power is flowing to the television, the television's receiver is not operational and does not receive the ON signal from the remote control 190. However, the MCU 144, upon receipt of the ON signal, sends a corresponding signal to the gate circuit 140, which in turn sends a signal to the power regulator 108 that causes the power regulator to switch from an OFF or open position to an ON or closed position. This restores the flow of power to the television, which may by default either turn ON or enter a STANDBY mode. If the MCU 144 determines that the television has entered the STANDBY mode (by measuring, for example, the flow of power through the power regulator 108), then the MCU 144 may cause the ISM 116 to transmit a replica of the ON signal previously received via the IRM 112 and/or the external IRM 120. In some embodiments, the MCU 144 may cause the ISM 116 to transmit a replica of the ON signal automatically, without first determining whether the television has entered the STANDBY mode. Because the television receiver is now powered, the television receives the "ON" signal transmitted by the ISM 116, and switches from the STANDBY mode to an operating mode (if not already in the operating mode).

The foregoing example illustrates one possible use case of the standby circuit 100. Importantly, the standby circuit 100 may be used with many electrical or electronic appliances other than a television. Moreover, in various embodiments of the present disclosure, the specific manner in which the standby circuit 100 operates may differ from one use case to another.

Although described as an infrared receiver, the IRM 112 may be configured to receive remote control signals sent via one or more other wireless communication protocols, including, for example, Radio Frequency (RF), Wi-Fi, Zig-Bee, Z-Wave, Bluetooth, Bluetooth Low Energy (BLE), GSM, LTE, Near Field Communication (NFC), and/or ultrasound. The external IRM 120 may be the same as or similar to the IRM 112, except that while the IRM 112 may be provided within a housing of or otherwise positioned adjacent to the MCU 144 and/or other components of the standby circuit 100, the external IRM 120 may be provided with a separate housing and may be located at a distance from the standby circuit 100. The external IRM 120 may, for example, be positioned in various locations within a predetermined distance from the standby circuit 100, so as to allow a user of the standby circuit 100 to position the external IRM 120 in a location where the external IRM 120 will be able to receive remote control signals that the IRM 112, by virtue of its location, may not be able to receive. For example, in some embodiments, the standby circuit 100 may be positioned along a cord of an electrical appliance, which may be located behind the appliance and out of sight. Such positioning may prevent the IRM 112 from receiving line-of-sight based control signals from a remote control 190. However, the external IRM 120 may be positioned adjacent to the electrical appliance (and, in some embodiments, adjacent to a built-in receiver of the electrical appliance), so as to be able to receive remote control signals directed at the electrical appliance. The external IRM 120 is in electrical communication with the MCU 144, whether via a wire, cable, or otherwise, so that data corresponding to remote control signals received by the external IRM 120 can be sent to the MCU 144.

The IRM 112 and the external IRM 120 may be used in connection with a proximity detection device 180. The proximity detection device 180 may be located within or adjacent to the standby circuit 100 and is used to determine the location of the remote control 190 with respect to the IRM 112 and the external IRM 120. According to embodiments of the present disclosure, the proximity detection device 180 includes at least one of a radio proximity detection device, a global positioning satellite (GPS) proximity detection device, a cellular triangulation proximity detection device, and a wireless triangulation proximity detection device. The remote control 190 may be or include, but is not limited to devices such as smartphones, tablet computers, personal digital assistants, smart watches, smart glasses, laptop computers, notebook computers, cellular telephones, and the like.

According to one embodiment of the present disclosure, priority is given to either the IRM 112 or the external IRM 120 based on the location of the IRM 112 to the remote control 190 or the location of the external IRM 120 to the remote control 190. For example, in some embodiments, if the remote control 190 is closer to the IRM 112 than the external IRM 120 based on an output from the proximity detection device 180, then the IRM 112 has priority over the external IRM 120 and the IRM 112 receives the control signal from the remote control 190. According to another embodiment of the present disclosure, priority is given to either the IRM 112 or the external IRM 120 based on the type of remote control 190 being used. For example, in some embodiments, if the remote control 190 is a smartphone, the IRM 112 has priority over any other type of control device and if the remote control 190 is a tablet computer, the external IRM 120 has priority over any other type of control device. Each of the different types of remote control devices and the corresponding IRMs are registered in memory of the standby circuit 100 beforehand. According to further embodiments of the present disclosure, priority is given to either the IRM 112 or the external IRM 120 based on the location and the type of control device being used. For example, if the IRM 112 has a smartphone registered as having priority over any other type of remote control device and has a predetermined distance threshold of about 10 feet from the remote control device, then the IRM 112 will only have priority over the external IRM 120 if both of the conditions are met. For example, the IRM 112 will only have priority over the external IRM 120 if the smartphone is used and the smartphone is located within 10 feet of the IRM 112. Alternatively, if the smartphone is not within the predetermined distance threshold of about 10 feet of the IRM 112, but within a predetermined threshold distance of the external IRM 120, then the external IRM 120 may be used.

The power regulator 108 may be, for example, a silicon controlled rectifier (SCR) switch. The power regulator 108 receives AC power via the AC In line 124 and outputs AC power via the AC Out line 128. The power regulator 108 may be or comprise any electronically controllable switch suitable for selectively permitting the flow of AC power therethrough. As described above, the power regulator 108 is controlled by the gate circuit 140, which in turn is controlled by the MCU 144.

Figure 2A:
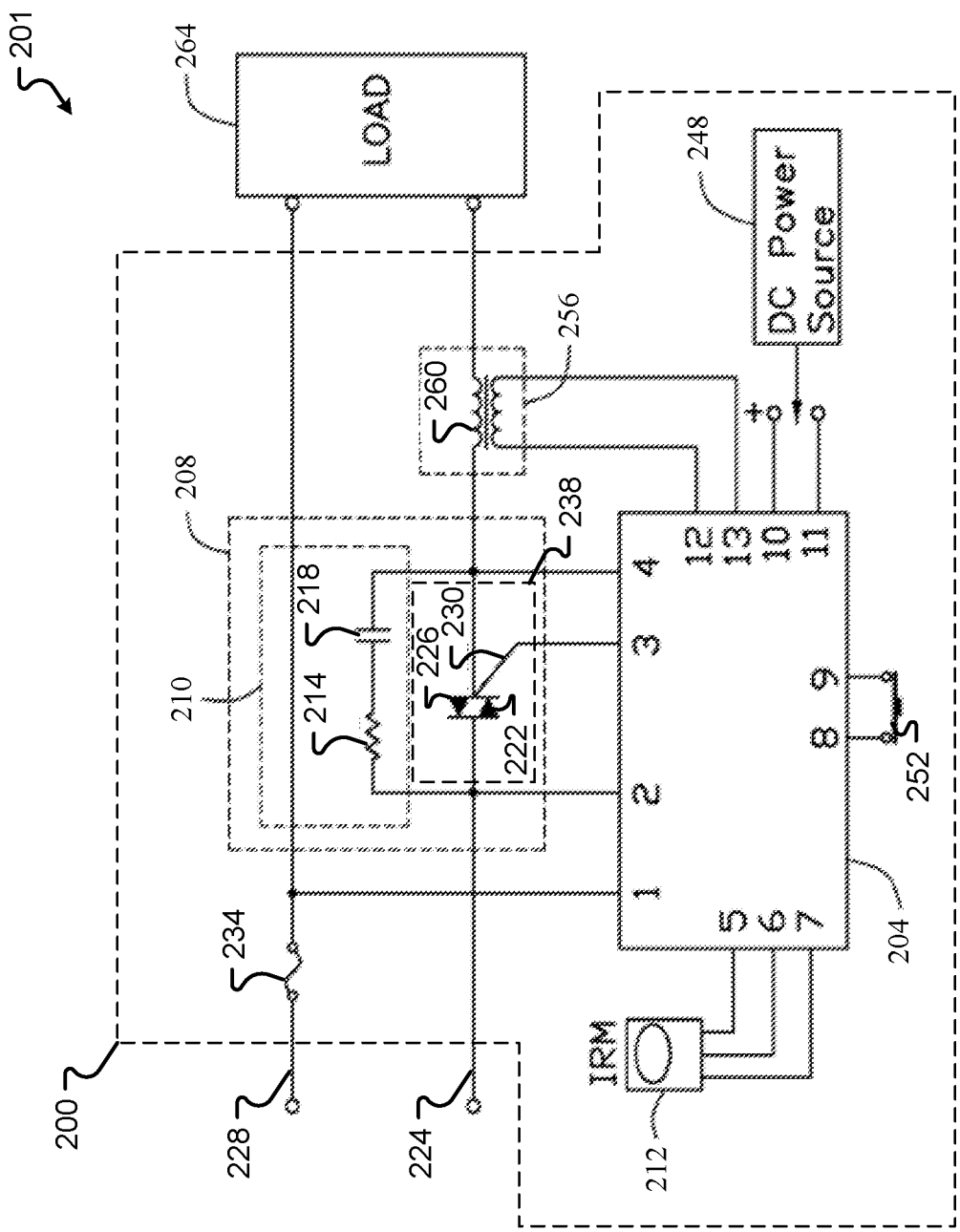
FIG. 2A is a circuit diagram of a standby circuit system according to embodiments of the present disclosure.

Turning now to FIG. 2A, a system 201 according to another embodiment of the present disclosure comprises a standby circuit 200 and a load 264. The standby circuit 200 may be provided in its own housing (not shown) but configured to be in electrical communication with a separately housed load 264, or the standby circuit 200 may be incorporated into a shared housing with the load 264. As previously described, the load 264 may be, for example, a television, an air conditioner, an electric fan, a refrigerator, a washing machine, or audio electronics. The standby circuit 200 may comprise an HIC module 204, a power regulator 208, an IRM 212, a DC power source 248, and a power detecting circuit 256.

The HIC module 204 may comprise one or more features of, and may be the same as or similar to, the HIC module 104 of the standby circuit 100. The HIC module 204 comprises pins 1 through 13. Pin 1 is connected to a wire or trace 228 of an AC power source (not shown). Pin 8 and pin 9 of the HIC module 204 (the eighth pin and the ninth pin of the HIC module 204) are connected to a switch 252, which may be used to reset the HIC module 204. The switch 252 may be an ON/OFF switch that allows a user to turn the HIC module 204 OFF and ON. Alternatively, the switch 252 may be configured to cause the HIC module 204 to reset in a manner that does not involve being turned OFF and ON. A user may flip, press or otherwise activate the switch 252 if the standby circuit 200 is not responding as expected, whether due to a malfunction of the HIC module 204 or otherwise.

The connections involving the other pins of the HIC module 204 are described in greater detail in connection with the discussion of other components of the standby circuit 200 below.

The power regulator 208 may be the same as or similar to the power regulator 108. The power regulator 208 may be switchable between an "ON" state and an "OFF" state, to connect or disconnect, respectively, the load 264 to the AC power source. The power regulator 208 may be or comprise a bi-directional silicon controlled rectifier (BSCR) 238, such as a triode for alternating current (TRIAC). The BSCR 238 may be, in some embodiments, an AC solid state switch with only ON and OFF positions. In some embodiments, an AC relay may be used instead of the BSCR 238. A first anode 222 of the BSCR 238 and a second anode 226 of the BSCR 238 are connected to the wire 224 from the AC power source. A control gate 230 of the BSCR 238 is connected to pin 3 of the HIC module 204 (the third pin of the HIC module 204) to control an "ON" state or an "OFF" state. If the BSCR 238 receives an "OFF" control signal from the HIC module 204, the BSCR 238 is switched to the "OFF" state. If the BSCR 238 receives an "ON" control signal from the HIC module 204, the BSCR 238 is switched to the "ON" state, so that the AC power source is able to provide power to the load 264.

The power regulator 208 may also comprise a resistor-capacitor (RC) circuit 210. The RC circuit 210 is used to filter a signal by blocking certain frequencies and passing others. More specifically, the RC circuit 210 is an RC absorption loop connected in parallel between two sides of the BSCR 238 to realize overvoltage protection of the BSCR 238. The RC circuit 210, then, acts as a voltage regulator. In some embodiments, the RC circuit 210 may be replaced by a bi-directional transient-voltage-suppression diode, or by another voltage regulator circuit. The RC circuit 210 includes a resistor 214 and a capacitor 218. The resistor 214 is in series with the capacitor 218, and the RC circuit 210 is in parallel with the first anode 222 of the BSCR 238 and the second anode 226 of the BSCR 238. The resistor 214 is connected to pin 2 of the HIC module 204 (the second pin of the HIC module 204) and the capacitor 218 is connected to pin 4 of the HIC module 204 (the fourth pin of the HIC module 204). In some embodiments, the power regulator 208 does not comprise an RC circuit 210 or other voltage regulator circuit.

The IRM 212 may be the same as or similar to the IRM 112. The IRM 212 is connected to pins 5, 6, and 7 of the HIC module 204 (the fifth, sixth, and seventh pins of the HIC module 204). The standby circuit 200 receives infrared signals from a user-operated remote control 190 via the IRM 212. When the load 264 is in a powered OFF state (such that the load 264 is unable to detect or respond to infrared signals from a user-operated remote control 190), such signals may nevertheless be received by the standby circuit 200 via the IRM 212, in response to which the HIC module 204 may send an "ON" signal via pin 3 of the HIC module 204 to the control gate 230, so as to cause the BSCR 210 to permit electricity to flow to the load 264. Alternatively, when the load 264 is in a powered ON state, the standby circuit 200 may receive an "OFF" command from a user-operated remote control 190, in response to which the HIC module 204 may send an "OFF" signal via pin 3 of the HIC module 204 to the control gate 230, so as to cause the BSCR 238 to stop the flow of electricity to the load 264.

The IRM 212 may be replaced by a receiver module adapted to detect control signals sent by any communication protocol that corresponds to the communication protocol used to remotely control the load 264. In some embodiments, a single receiver module may be configured to detect signals from a plurality of communication protocols. In other embodiments, the standby circuit 200 may comprise a plurality of receiver modules, each configured to detect control signals sent via one or more different communication protocols. Also, although not shown in FIG. 2A, in some embodiments, the standby circuit 200 may be connected to an external IRM identical or similar to the IRM 120, whether instead of or in addition to comprising the IRM 212.

The standby circuit 200 may also comprise a circuit protection device 234. The circuit protection device 234 may be a fuse, a circuit breaker, or other automatic disconnection of supply device. The protection device 234 of the standby circuit 200 is positioned along the AC power source line 228, such that if too much current flows through the line 228, the protection device 234 will function to break the connection of the standby circuit 200 to the AC power supply, thus stopping the flow of electricity therethrough.

The direct current (DC) power source 248 is operatively connected to pins 10 and 11 of the HIC module 204 (the tenth and eleventh pins of the HIC module 204), and may act as a primary or as an alternative power source to the HIC module 204. Thus, for example, if the HIC module 204 ceases to receive power through the first pin (i.e., pin 1) thereof (whether because the circuit protection device 234 has been activated, or because the BSCR 238 is in an OFF position, or simply is not configured to receive power through the first pin thereof), the HIC module 204 can continue to operate using power received from the DC power source 248. The ability of the HIC module 204 to continue operating without or even when the flow of power from the AC power supply is interrupted beneficially enables the standby circuit 200 to detect (via the IRM 212) "ON" control signals transmitted by a user-operated remote control 190 and restore the flow of AC power to the load 264 by switching the BSCR 238 from the "OFF" position to the "ON" position. As a result, even when the load 264 is completely turned OFF (and thus conserving power), the remote control 190 can still be used to turn ON the load 264, via the standby circuit 200. Moreover, as long as the HIC module 204 draws less power from the DC power source 248 than the amount of power drawn by a standby circuit of the load 264, the standby circuit 200 facilitates a net power savings.

The DC power source 248 may be, for example, a battery power source, a capacitor power source, or any other DC power source. The DC power source 248 may be rechargeable and/or replaceable.

The standby circuit 200 also includes a power detecting circuit 256, which may include a current transformer 260. The power detecting circuit 256 may be coupled between the power regulator 208 and the load 264. A primary coil of the current transformer 260 may be connected to the load 264, and a secondary coil of the current transformer 260 may be connected to the pin 12 and pin 13 of the HIC module 204 (the twelfth and thirteenth pins of the HIC module 204). Therefore, when the current transformer 260 is connected via the wire 224 to an AC power source, the secondary coil of the current transformer 260 may generate an output current through pin 12 and pin 13 of the HIC module 204 (the twelfth pin and the thirteenth pin of the HIC module 204) to the HIC module 204.

In some embodiments, the power detecting circuit 256 may be or comprise a Hall current sensor, which may be used to detect and/or measure an operating current of the load 264, and to provide a signal corresponding to the measured operating current to the HIC module 204.

Based on the output current of the power detecting circuit 256, the HIC module 204 determines a mode of the load 264 (e.g., a STANDBY mode or an operating mode). For example, if the load 264 is in STANDBY mode, then the output current generated by the power detecting circuit 256 will be underneath a predetermined threshold. If the load 264 is in an operating mode, however, then the output current generated by the power detecting circuit 256 will be above a predetermined threshold. By comparing the output current generated by the power detecting circuit 256 to one or more predetermined thresholds, the HIC module 204 can determine whether the load 264 is in an operating mode or a STANDBY mode.

In some embodiments, the HIC module 204 receives the output current of the secondary coil of the current transformer 260, and obtains an input voltage from the AC power source (not shown) via the wire 224 or 228 which is the reference voltage. With this information, the HIC module 204 calculates the power of the load 264, which information the HIC module 204 uses to determine whether the load 264 is in the operating mode or the STANDBY mode. If the power of the load 264 is within a predetermined standby range (i.e., 1~3 W), the HIC module 204 determines that the load 264 is in the STANDBY mode. If the power of the load 264 is larger than the upper bound (i.e., 3 W) of the predetermined standby range, the HIC module 204 may determine that the load 264 is in the operating mode.

The HIC module 204 controls a mode of the power regulator 208 (e.g., switches the power regulator 208 from an "ON" state to an "OFF" state or vice versa) based on whether the load 264 is in the STANDBY mode or the operating mode. For example, the HIC module 204 causes the power regulator 208 to switch into an "OFF" state when the load 264 is in the STANDBY mode, thus cutting off AC power to the load 264 and reducing power consumption.

In some embodiments, then, if the power consumption of the load 264 (as calculated by the HIC module 204, based on information from the power detecting circuit 256) is within the predetermined standby range (where the predetermined standby range is less than a predetermined operating range of the load 264), the HIC module 204 outputs an "OFF" control signal to the power regulator 208 to control the power regulator 208 into the "OFF" state. As a result, the total power consumption of the load 264 decreases from approximately 1 to 3 W to 0 W, while the standby circuit 200 consumes less than, for example, 0.1 W. Power consumption, therefore, is reduced.

In some embodiments, the HIC module 204 may receive at least one command regarding a desired power mode of the load 264 from a remote control 190 operated by a user, such as a "turn ON" command or a "turn OFF" command. Notably, when the load 264 is in an "OFF" state (and therefore unable to recognize or respond to a remote control signal), the IRM 212 is still able to receive a remote control signal (e.g., a "turn ON" command), such that the power state of the load 264 can still be adjusted even when the load 264 itself is disconnected from any power and/or switched completely OFF. On the other hand, when the load 264 is in an "ON" state, both the load 264 and the HIC module 204 (via the IRM 212) may receive remote control signals. The HIC module 204, may, however, be configured to ignore (or to not detect, or to not respond to) remote control signals other than signals corresponding to "turn ON," "turn OFF," and any other power-related commands.

Also, the HIC module 204 may receive the at least one command from the user via other types of communication interfaces, such as a Wi-Fi, ZigBee, Bluetooth, LGE, LTE, GSM, NFC, optical, RF, or other communication interface. Such other types of communication interfaces may be built into the HIC module 204 or separate from but in electrical communication with the HIC module 204.

As a more specific example of the operation of the standby circuit 200 according to some embodiments of the present disclosure, after receiving a "turn OFF" command from the user (e.g., via a wireless remote control 190), the HIC module 204 determines whether the load 264 is in the "OFF" state according to the output power of the power detecting circuit 256. That is, the power detecting circuit 256 determines whether the power of the load 264 is in a predetermined standby range, such as within approximately 1-3 W (indicating that the load 264 is in a STANDBY mode).

If the power of the load 264 is larger than the upper bound of the predetermined range (indicating that the load 264 is powered ON and in an operating mode), the HIC module 204 may delay a first predetermined length of time before outputting an "OFF" control signal to the power regulator 208, which signal causes the power regulator 208 to switch into the "OFF" state (and thus stops the flow of AC current to the load 264 altogether). Waiting the first predetermined length of time to send the "OFF" control signal to the power regulator 208 allows time for the load 264, which also received the "turn OFF" command via its own remote control signal receiver, to switch into the STANDBY mode in response thereto before the power regulator 208 cuts all power to the load 264.

Conversely, after receiving a "turn ON" command from the user (e.g., via a wireless remote control 190)—which command is not also received by the load 264, because the load 264 is in an OFF state—the HIC module 204 outputs an "ON" control signal to the power regulator 208, which switches to an "ON" state and thus restores the flow of AC current from the AC power source to the load 264. With its power supply restored, the load 264 switches to the operating mode.

In addition, after receiving the "turn ON" command, the HIC module 204 may receive, a second predetermined length of time after the power regulator 208 is switched to the "ON" position, a signal corresponding to the detected current being supplied to the load 264. Based upon this signal, the HIC module 204 may determine whether the power of the load 264 is larger than the upper bound of the predetermined standby range.

If the power of the load 264 is larger than the upper bound of the predetermined standby range, then the load 264 is in a normal state of the operating mode. If the power of the load 264 is within the predetermined range, then the load 264 is in an abnormal state of the operating mode. If the load 264 is in the abnormal state of the operating mode, the HIC module 204 outputs a warning signal according to the abnormal state. The warning signal may cause an LED associated with the standby circuit 200 to flash or otherwise illuminate, and/or may cause a speaker associated with the standby circuit 200 to generate a beep or other audible sound, and/or may cause an error message to be shown on an LCD or other display associated with the standby circuit 200.

Notably, the HIC module 204, the power detecting circuit 256, and the power regulator 208 may be installed in and/or connected to any appliance or other load 264, including any of the appliances identified herein.

Figure 2B:
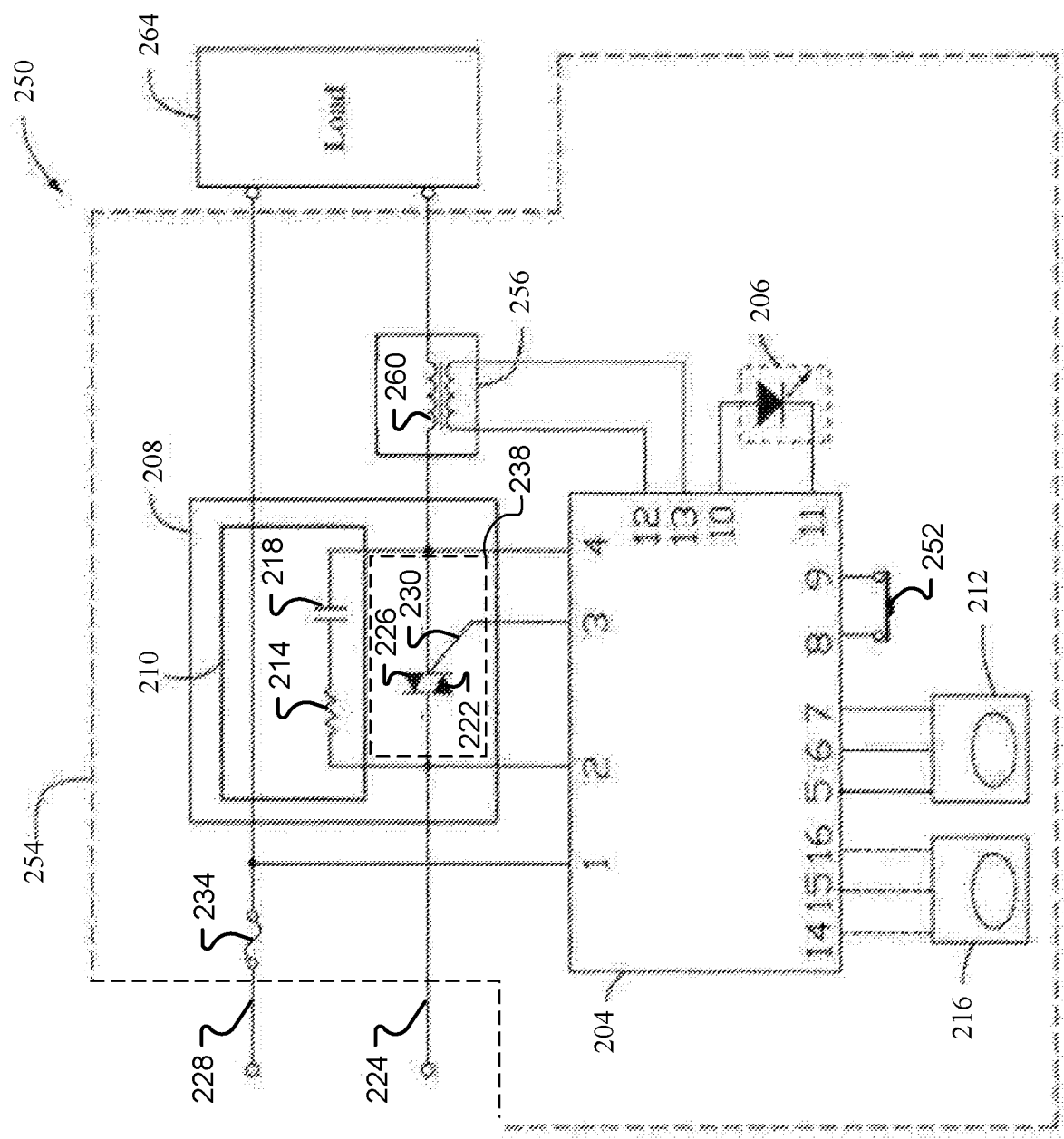
FIG. 2B is another circuit diagram of a standby circuit system according to additional embodiments of the present disclosure.

With reference now to FIG. 2B, a standby circuit system 250 according to another embodiment of the present disclosure comprises a standby circuit 254 and a load 264. The standby circuit 254 comprises many of the same or similar components as the standby circuit 200 of FIG. 2A, including an HIC module 204, a power regulator 208, an IRM 212, and a power detecting circuit 256. The standby circuit 254 also comprises an LED 206 and an ISM 216. The load 264 may be the same as or substantially similar to the load 264 in the embodiment of FIG. 2A. The standby circuit 254 may be provided in its own housing (not shown) or may be incorporated into the housing of a standby device.

In the embodiment of FIG. 2B, pins 10 and 11 of the HIC module 204 (the tenth and eleventh pins of the HIC module 204), instead of being connected to a DC power source, are connected to one or more LEDs 206. The HIC module 204 may control the one or more LEDs 206 to emit a first color of light (e.g., green) when the standby circuit 254 and/or the load 264 are operating normally, and to emit a second color of light (e.g., red) when the standby circuit 254 and/or the load 264 are operating abnormally. Abnormal operation may include, for example, when the load 264 is expected to be in an operating mode but is instead in a STANDBY mode; when the load 264 is expected to be in a STANDBY mode but is instead in an operating mode; and when the HIC module 204 freezes or otherwise encounters an internal fault or error that prevents continued operation as described herein. In some embodiments, the one or more LEDs 206 may emit only a single color of light, but may emit a steady stream of light when the standby circuit system 250 is operating normally and a flashing light when the standby circuit system 250 is operating abnormally. In yet other embodiments, the one or more LEDs 206 may be configured to change one or more of a flashing sequence, a color, an intensity, or any other characteristic based on a change in the operating status of the HIC module 204, and/or of the load 264, and/or of the standby circuit 254.

The HIC module 204 of the embodiment of FIG. 2B comprises three additional pins—pins 14, 15, and 16—than the HIC module 204 of the embodiment of FIG. 2A. These additional pins (the fourteenth, fifteenth, and sixteenth pins of the HIC module 204) are operatively connected to an ISM 216. As with the ISM 116, the ISM 216 may be used to transmit a replica of an "ON" signal received via the IRM 212, after the power regulator 208 has restored power to the load 264, so that the load 264 can receive the "ON" signal and switch from a STANDBY state to an operating state.

The HIC module 204 may be used to control the state of the power regulator 208 (e.g., to cause the power regulator 208 to switch between the "ON" state and the "OFF" state) based on the mode of the load 264 (e.g., whether the load 264 is in the STANDBY mode or the operating mode). For example, the HIC module 204 can control the power regulator 208 to be in the OFF state when the load 264 is in the STANDBY mode, so as to turn OFF the power from the AC power source to the load 264, thereby reducing the power consumption of the load 264 to zero.

In the embodiment of FIG. 2B, as in the embodiment of FIG. 2A, the IRM 212 may be replaced by a receiver module adapted to detect control signals sent by any communication protocol that corresponds to the communication protocol used to remotely control the load 264. In some embodiments, a single receiver module may be configured to detect signals from a plurality of communication protocols. In other embodiments, the standby circuit 254 may comprise a plurality of receiver modules, each configured to detect control signals sent via one or more different communication protocols. Also, although not shown in FIG. 2A, in some embodiments, the standby circuit 254 may be connected to an external IRM identical or similar to the IRM 120, whether instead of or in addition to comprising the IRM 212.

Except as described above, the operation of the standby circuit 254 may be the same as or substantially similar to that of the standby circuit 200.

Figure 3:
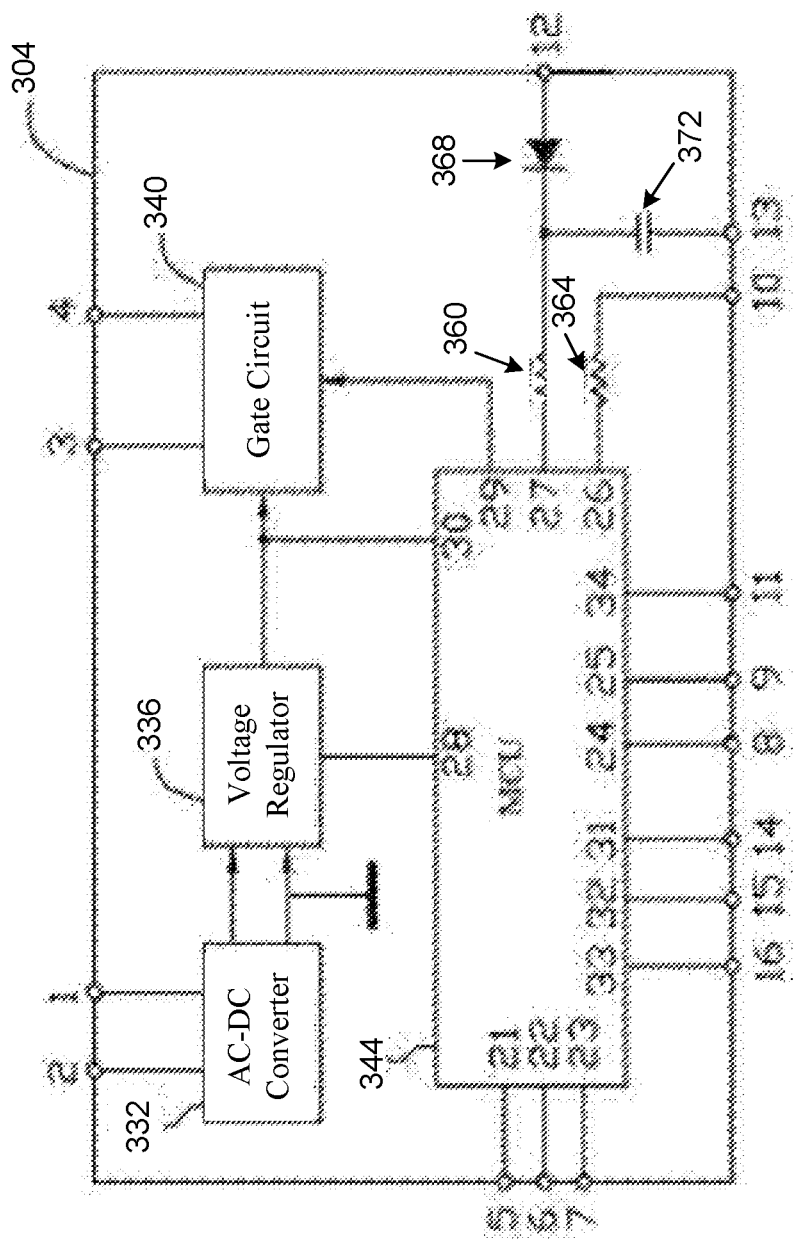
FIG. 3 illustrates a circuit diagram of a hybrid integrated circuit (HIC) module according to one embodiment of the present disclosure.

FIG. 3 illustrates a circuit diagram of a hybrid integrated circuit (HIC) module 304 according to one embodiment of the present disclosure. The HIC module 304 may be, for example, a thick film HIC module which may comprise one or more features of and may be the same as or similar to the HIC module 104 illustrated in FIG. 1 or the HIC module 204 illustrated in FIGS. 2A and 2B. The HIC module 304 includes an AC-DC converter 332, a voltage regulator 336, a gate circuit 340, and a microcontroller unit (MCU) 344, as well as other active and passive components described below.

The HIC module 304 comprises pins 1 through 16 for connection to various components, such as the components provided and described in FIGS. 1, 2A and 2B. For example, pins 1 and 2 (the first and second pins of the HIC module 304) may be provided for connection to an AC power source. As illustrated, a first terminal and a second terminal of the AC-DC converter 332 are coupled to the pin 1 and pin 2 of the HIC module 304, respectively, to be coupled to a live line and a neutral line, respectively, of an AC power source. The AC-DC converter 332 converts AC power to DC power and transmits the DC power to the voltage regulator 336. The voltage regulator 336 performs a voltage stabilization operation on the DC power. The voltage regulator 336 outputs a stabilized DC power to the gate circuit 340 and to the MCU 344, to provide power for the gate circuit 340 and the MCU 344.

Pins 3 and 4 of the HIC module 304 (the third pin and the fourth pin of the HIC module 304) may be provided for connection to an RC circuit of a power regulator such as RC circuit 210 and power regulator 208 illustrated in FIGS. 2A and 2B. Pins 5, 6, and 7 of the HIC module 304 (the fifth, sixth, and seventh pins of the HIC module 304) are provided for connection to an external component such as an IRM (e.g., the IRM 212 illustrated in FIG. 2). Pins 8 and pin 9 of the HIC module 304 (the eighth pin and the ninth pin of the HIC module 304) are provided for connection to a switch (such as the switch 252 illustrated in FIG. 2) which may be used to reset the HIC module 304. Pins 10 and 11 of the HIC module 304 (the tenth pin and eleventh pin of the HIC module 304) are provided for connection to one or more LEDs such as the one or more LEDs 206 illustrated in FIG. 2. Pins 12 and 13 of the HIC module 304 (the twelfth pin and thirteenth pin of the HIC module 304) are provided for connection to the output of a transformer such as the output of transformer 260 illustrated in FIGS. 2A and 2B. Pins 14, 15 and 16 of HIC module 304 (the fourteenth, fifteenth and sixteenth pins of HIC module 304) are provided for connection to an IRM such as the IRM 212 illustrated in FIGS. 2A and 2B.

The MCU 344 is a specially programmed controller able to control the operations (e.g., switching actions) of each of the circuit components of the HIC module 304 through the use of stored programs, such that when the programs are executed, the MCU 344 can perform functions, including for example, arithmetic, logic, controlling, and input/output operations specified by the programs. The MCU 344 comprises one or more features of and may be the same as or similar to the MCU 144 illustrated in FIG. 1. In at least one embodiment of the present disclosure, the MCU 344 includes fourteen pins (pins 21 through 34). Pins 21, 22, and pin 23 of the MCU 344 (the first, second and third pins of the MCU 344) are connected to pins 5, 6 and 7, respectively, of the HIC module 304. The MCU 344 can receive a signal through a first interface comprising pins 5, 6 and 7 of the HIC module 304. For example, the MCU 344 can receive a signal from an IRM such as IRM 112 illustrated in FIG. 1 or IRM 212 illustrated in FIGS. 2A and 2B connected to pins 5, 6 and 7 of the HIC module 304.

Pin 24 and pin 25 of the MCU 344 (the fourth and fifth pins of the MCU 344) are connected to pin 8 and pin 9, respectively, of the HIC module 304, so as to reset the MCU 344 through a switch such as switch 252 illustrated in FIGS. 2A and 2B. Pin 26 of the MCU 344 (the sixth pin of the MCU 344) is connected to pin 10 of the HIC module 304 via a resistor 364, and pin 34 of the MCU 344 (the fourteenth pin of the MCU 344) is connected to pin 11 of the HIC module 304. With this arrangement, pin 26 of the MCU 344 is provided to be couple to an external component such as the anode of an LED (e.g., the one or more LEDs 206 illustrated in FIG. 2B) and pin 34 of the MCU 344 is provided to be coupled to the cathode of the same LED(s).

Pin 27 of the MCU 344 (the seventh pin of the MCU 344) is connected to pin 12 of the HIC module 304 through a diode 368 and a resistor 360, and is also coupled to the pin 13 of the HIC module 304 through the resistor 368 and a capacitor 372. In at least one embodiment of the present disclosure, pin 27 of the MCU 344 is coupled to a first terminal of the resistor 360, a second terminal of the resistor 360 is coupled to a cathode of the diode 368, and an anode of the diode 368 is coupled to the pin 12 of the HIC module 304. The capacitor 372 is coupled between a node of the resistor 360 and the diode 368, and pin 13 of the HIC module 304, to receive the output current of a transformer such as transformer 260 illustrated in FIGS. 2A and 2B. The joint effect between the resistors 360 and 364, the diode 368 and the capacitor 372 is used to take the data from the control device (e.g., the TV) while the control device is in an operating mode or a STANDBY mode and convert the data into a direct current voltage that is input into the MCU 344 to cause the MCU 344 to perform calculations while protecting the internal components of the MCU 344 from large voltages supplied as inputs to the MCU 344. According to one embodiment of the present disclosure, the resistors 360 and 364, the diode 368 and the capacitor 372 may be configured to produce a regulating input on the input pins 26 and 27. Alternatively, according to an embodiment of the present disclosure, the resistors 360 and 364 operate as protection mechanisms in the form of current limiting resistors. The resistors 360 and 364 are sized so that the voltage drops across them does not affect the voltage at the MCU 344. According to a further embodiment of the present disclosure, the capacitor 372 in conjunction with the resistor 360 operate as a protection mechanism in the form of a low pass filter used to filter a signal by blocking certain frequencies and passing other frequencies. According to a further embodiment of the present disclosure, the diode 368 in conjunction with the resistor 360 and the capacitor 372 operate as a further protection mechanism for the MCU 344. Pin 28 of the MCU 344 (the eighth pin of the MCU 344) is connected to the voltage regulator 336, to output an operational signal from the MCU 344 to the voltage regulator 336. For example, when an operating mode of the MCU 344 switches from a SLEEP mode (e.g., no power to the device and the device is OFF) to a WAKE-UP mode, the MCU 344 outputs a first operational signal to the voltage regulator 336 through pin 28 of the MCU 344. The voltage regulator 336 performs a voltage stabilizing operation based on the first operational signal provided by the MCU 344. When the operating mode of the MCU 344 switches from the WAKE-UP mode to the SLEEP mode, the MCU 344 outputs a second operational signal to the voltage regulator 336 through pin 28 of the MCU 344. The voltage regulator 336 outputs a SLEEP signal to the MCU 344, to put the load in the SLEEP mode. In at least one embodiment of the present disclosure, the voltage regulator 336 outputs the SLEEP signal to the MCU 344 through the pin 30 of the MCU 344 (the tenth pin of the MCU 344).

Pin 29 of the MCU 344 (the ninth pin of the MCU 344) is connected to the gate circuit 340 to provide a control signal to the gate circuit 340. The gate circuit 340 is connected to pin 3 and pin 4 of the HIC module 304. The gate circuit 340 is a switch control component that triggers the mode of a component coupled to the HIC module 304 at pins 3 and 4, such as a power regulator for example. The power regulator 108 illustrated in FIG. 1 and the power regulator 208 illustrated in FIGS. 2A and 2B operate based on a trigger signal, such as an ON command or an OFF command, provided by the gate circuit 340. Pins 31, 32 and 33 of the MCU 344 (the eleventh, twelfth and thirteenth pins of the MCU 344) are coupled to the pins 14, 15 and 16, respectively, of the HIC module 304 to transmit replica commands (e.g., copies of commands generated by user interaction with a remote control 190) through a component such as an ISM (e.g., the ISM 216 of FIG. 2).

In at least one embodiment of the present disclosure, the MCU 344 itself can operate in several modes, including but not limited to a SLEEP mode or a WAKE-UP mode, such that the HIC module 304 can operate in different modes according to the operating mode of the MCU 344. As an example, after receiving an OFF command from a remote control 190, the MCU 344 controls the BSCR 238 to the OFF state, and the MCU 344 can switch to the SLEEP mode, so the HIC module 304 can also enter into the SLEEP mode. Accordingly, the MCU 344 can reduce its power consumption and further reduce the standby power consumption since the MCU 344 only draws about 0.5 W of power while in the SLEEP mode.

After receiving an ON command from a remote control 190, the MCU 344 switches to the WAKE-UP mode from the SLEEP mode, which causes the HIC module 304 to switch from the SLEEP mode to a WAKE-UP mode. The HIC module 304 can further control the BSCR 238 to be in an on state. Hence, AC power is allowed to flow to the load 264, which in turn can revert to an operating mode.

In at least one embodiment of the present disclosure, after receiving an ON command through pin 21 to pin 23 of the MCU 344, the MCU 344 switches from the SLEEP mode to the WAKE-UP mode. When the MCU 344 switches to the WAKE-UP mode, the MCU 344 outputs a first operation signal to the voltage regulator 336. At that point, the voltage regulator receives the first operation signal, and outputs the stabilized DC power to the MCU 344, to provide a start-up current to the MCU 344 and the gate circuit 340.

The start-up current can continue for a period of time, for example, from 1 to at least 10 milliseconds. The MCU 344 can provide the control signal to the gate circuit 340 through pin 29 of the MCU 344, which causes the power regulator (e.g., the power regulator 108 of FIG. 1, or the power regulator 208 of FIG. 2A or 2B) to be in the ON state. Once the power regulator switches to the ON state, the load (e.g., the load 264) receives power from the AC power source and switches to the operating mode.

In some embodiments, the HIC module 304 and a corresponding power regulator (together with other components of the standby circuits described herein) may be installed inside the appliances.

Figure 4:
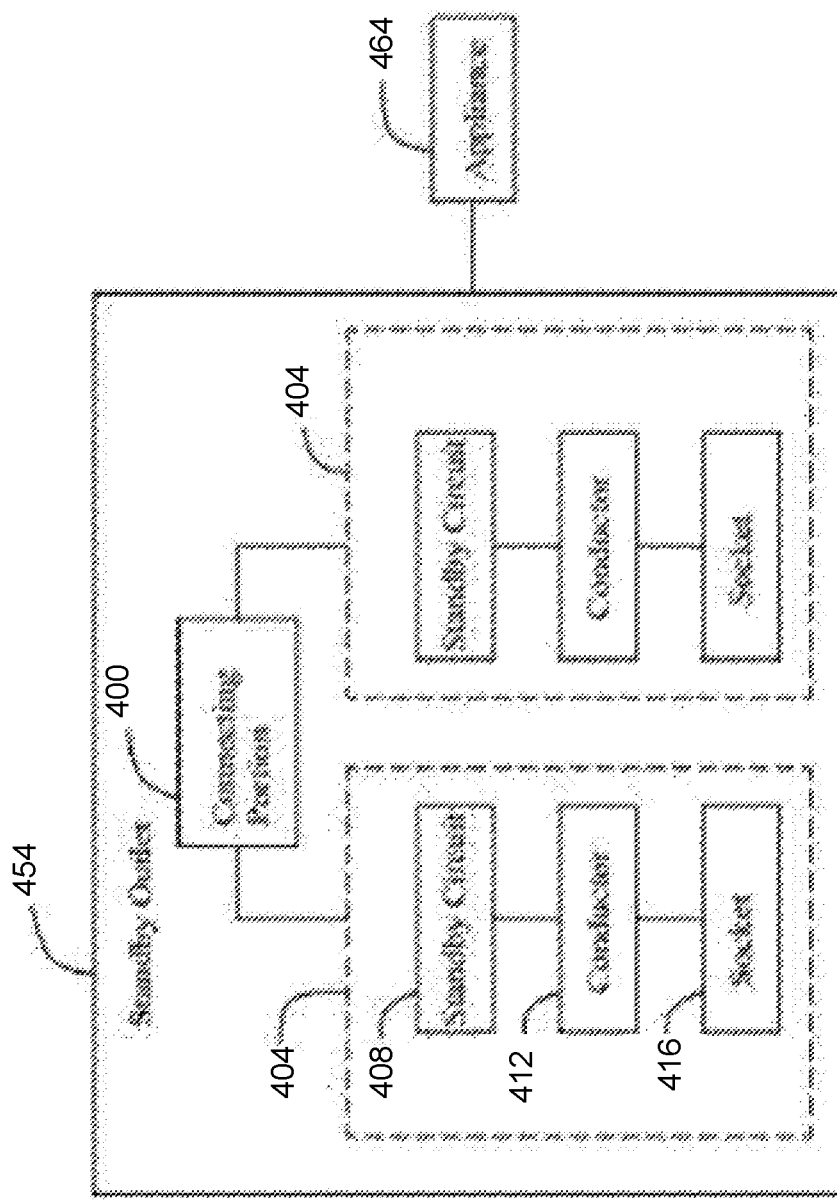
FIG. 4 is a block diagram of a standby outlet according to embodiments of the present disclosure.

FIG. 4 illustrates a standby outlet 454 according to one embodiment of the present disclosure. The standby outlet 454 includes a connecting portion 400 and at least one outlet unit 404. The connecting portion 400 is coupled to an AC power source as well as to each of the outlet units 404 to provide power to each of the outlet units 404.

Each outlet unit 404 comprises a standby circuit 408, at least one conductor 412, and at least one socket 416. The conductor 412 of each of the outlet units 404 is coupled to the connecting portion 400. The standby circuit 408 is arranged between the connecting portion 400 and a corresponding conductor 412. An electronic appliance 464 is coupled to the conductor 412 of a corresponding outlet unit 404 (e.g., by inserting a plug of the appliance 464 (not shown) into the socket 416), so that the electronic appliance 464 can receive operating power. In at least one embodiment of the present disclosure, the standby circuit 408 performs the same or similar functions to those of the standby circuit 100 illustrated in FIG. 1, standby circuit 200 illustrated in FIG. 2A and/or the standby circuit 254 illustrated in FIG. 2B.

In at least one embodiment of the present disclosure, the connecting portion 400 of the standby outlet 454 is coupled to each outlet unit 404 through a wire. The connecting portion 400 and the outlet units 404 can be arranged in a housing or a shell, which forms a power adapter. The electronic appliance 464 can be plugged into the power adapter (and, more specifically, into a socket 416 of the power adapter).

Figure 5B:
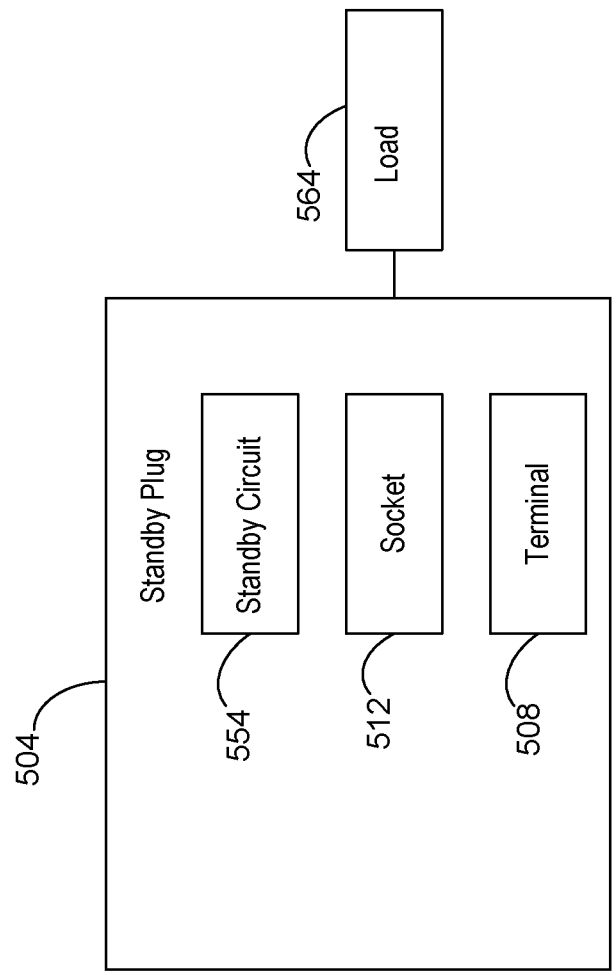
FIG. 5B illustrates a circuit block diagram of the standby plug coupled to the load according to one embodiment of the present disclosure.
Figure 5A:
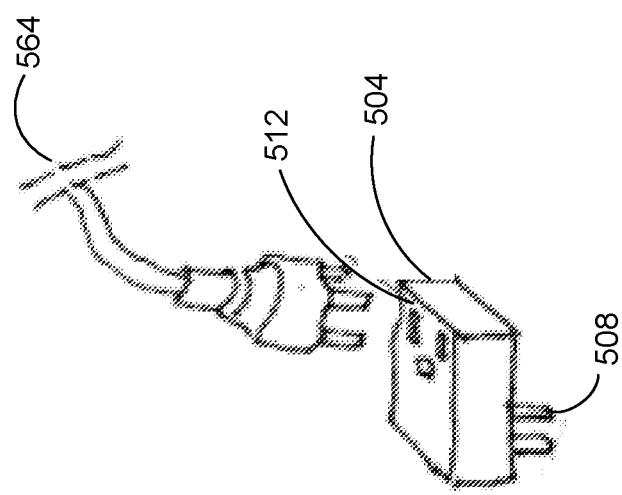
FIG. 5A is a block diagram of a standby plug and a load to be coupled to the standby plug according to one embodiment of the present disclosure.

FIG. 5A is a block diagram of a standby plug 504 and a load (e.g., an appliance) 564 to be coupled to the standby plug 504 and FIG. 5B illustrates circuit block diagram of the standby plug 504 detachably coupled to the standby plug 504 according to one embodiment of the present disclosure. The standby plug 504 comprises a standby circuit 554, a plurality of terminals 508 and a plurality of sockets 512 to receive terminals provided by the load 564. In at least one embodiment of the present disclosure, the standby circuit 554 performs the same or similar functions to those of the standby circuit 100 illustrated in FIG. 1, standby circuit 200 illustrated in FIG. 2A or the standby circuit 254 illustrated in FIG. 2B.

The plurality of terminals 508 are arranged in a manner that corresponds to a standard electrical socket. Standard electrical sockets may have various forms, including for example a two-receptacle type or a three-receptacle type. According to one embodiment of the present disclosure, the two-receptacle type can comprise a live line terminal and a neutral line terminal. According to another embodiment of the present disclosure, the three-receptacle type can comprise a live line terminal, a neutral line, and a ground line terminal. The terminals 508 of the standby plug 504 are in electronic communication with the load 564, whether through a wire connection or otherwise.

Figure 6:
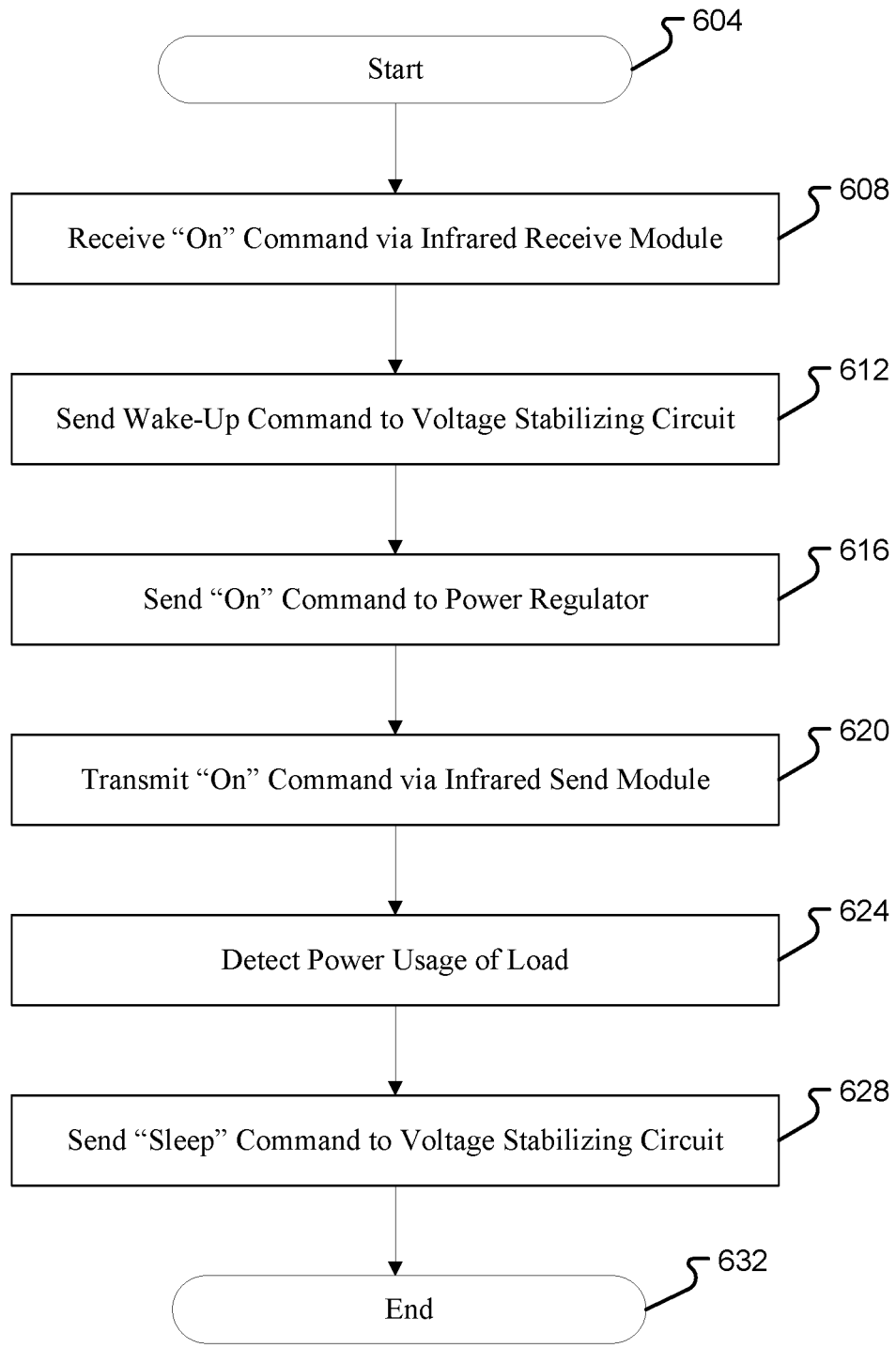
FIG. 6 is a flowchart illustrating a method according to embodiments of the present disclosure.

FIG. 6 is a flowchart illustrating a process for reducing standby power consumption 600 according to at least some embodiments of the present disclosure. As illustrated in this figure, process 600 starts at block 604. At block 608, a standby circuit (such as the standby circuit 100 illustrated in FIG. 1, the standby circuit 200 illustrated in FIG. 2A or the standby circuit 254 illustrated in FIG. 2B) including a microcontroller unit (MCU) (such as the MCU 144 illustrated in FIG. 1 or the MCU 344 illustrated in FIG. 3) receives an "ON" command via an infrared receive module (such as the IRM 112 or the external IRM 120 illustrated in FIG. 1 or IRM 212 illustrated in FIGS. 2A and 2B) from a remote control 190, for example. At block 612, a WAKE-UP command is sent from the standby circuit/MCU to a voltage regulator (such as the voltage regulator 136 illustrated in FIG. 1 or the voltage regulator 336 illustrated in FIG. 3). At block 616, a gate circuit of the standby circuit/MCU (such as the gate circuit 140 illustrated in FIG. 1 or the gate circuit 340 illustrated in FIG. 3) sends an "ON" command to a power regulator (such as the power regulator 108 illustrated in FIG. 1 or the power regulator 208 illustrated in FIGS. 2A and 2B). At block 620, the standby circuit/MCU transmits an "ON" command via an infrared send module (such as the ISM 116 illustrated in FIG. 1 or the ISM 216 illustrated in FIG. 2B) to a load (such as the load 264 illustrated in FIGS. 2A and 2B). At block 624, the power detecting circuit of the standby circuit/MCU detects the power usage of the load. For example, a power detecting circuit such as the power detecting circuit 256 illustrated in FIGS. 2A and 2B detects the amount of power utilized by the load 264. At block 628, the standby circuit/MCU sends a SLEEP command to the voltage regulator. After the standby circuit/MCU sends a SLEEP command to the voltage regulator at block 628, process 600 ends at block 632.

Figure 7:
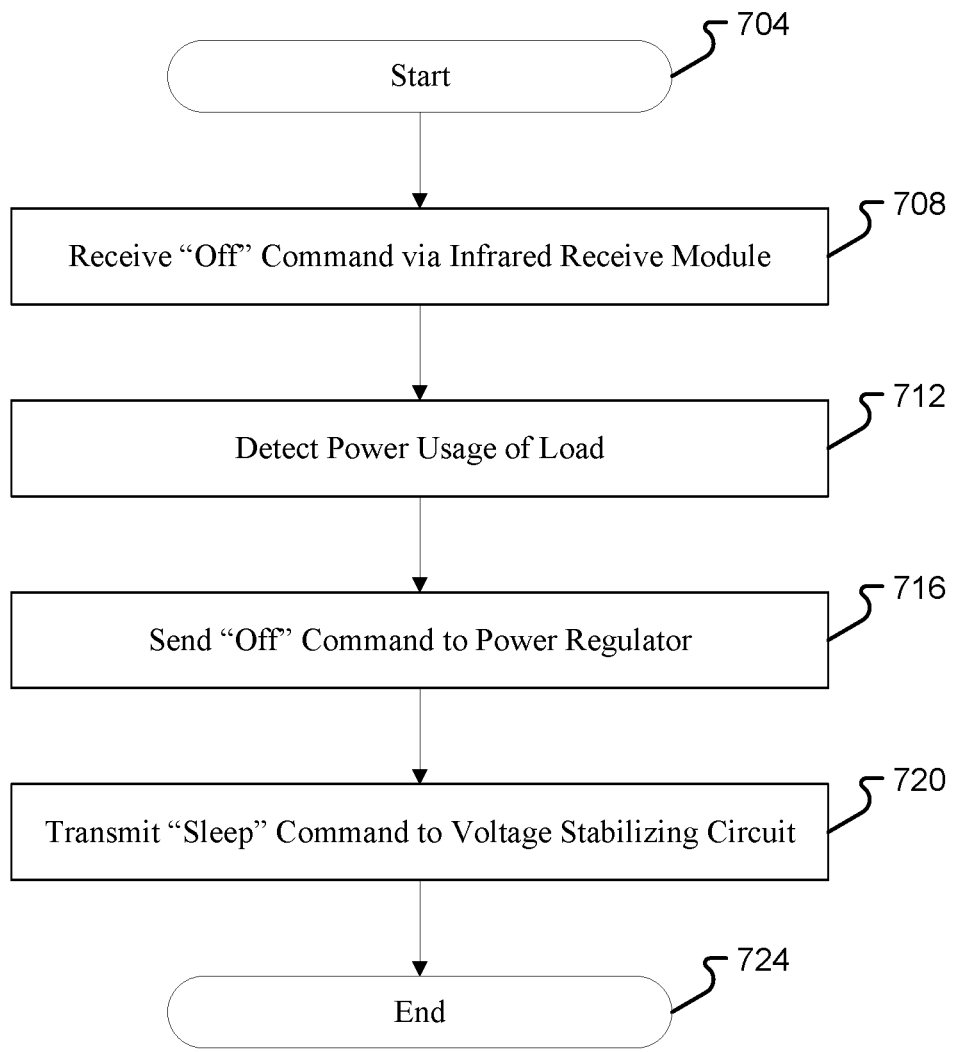
FIG. 7 is a flowchart illustrating another method according to embodiments of the present disclosure.

FIG. 7 is a flowchart illustrating another exemplary process 700 for reducing standby power consumption according to embodiments of the present disclosure. As illustrated in this example, process 700 starts at block 704. At block 708, a standby circuit (such as the standby circuit 100 illustrated in FIG. 1, the standby circuit 200 illustrated in FIG. 2A or the standby circuit 254 illustrated in FIG. 2B) including a microcontroller unit (MCU) (such as the MCU 144 illustrated in FIG. 1 or the MCU 344 illustrated in FIG. 3), receives an "OFF" command via an infrared receive module (such as the IRM 112 or the external IRM 120 illustrated in FIG. 1, or the IRM 212 illustrated in FIGS. 2A and 2B) from a remote control 190, for example. At block 712, the power detecting circuit of the standby circuit/MCU detects the power usage of a load (such as the load 264 illustrated in FIGS. 2A and 2B). For example, the power detecting circuit 256 illustrated in FIGS. 2A and 2B detects the amount of power utilized by the load 264. At block 716, the gate circuit of the standby circuit/MCU (such as the gate circuit 140 illustrated in FIG. 1 or the gate circuit 340 illustrated in FIG. 3) sends an "OFF" command to the power regulator (e.g., the power regulator 108 illustrated in FIG. 1 or the power regulator 208 illustrated in FIGS. 2A and 2B). At block 720, a SLEEP command is sent from the standby circuit/MCU to a voltage regulator (such as the voltage regulator 136 illustrated in FIG. 1 or the voltage regulator 336 illustrated in FIG. 3), to enable the standby circuit/MCU to enter a SLEEP mode. After the standby circuit/MCU transmits the SLEEP command at block 720, the process 700 ends at block 724.

Standby circuits according to embodiments of the present disclosure may be configured as stand-alone units for use with existing electric/electronic appliances, and/or may be configured to be included within newly built electric/electronic appliances. In some embodiments, a standby plug as described herein may be retrofitted to an electric/electronic appliance that does not comprise a standby circuit as described herein. Also, in some embodiments, an electric/electronic appliance that does not comprise a standby circuit as described herein may be plugged into a standby outlet as described herein.

A number of variations and modifications of the foregoing disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A standby circuit, comprising:
a power regulator configured to operate in an ON state and an OFF state;
a power detecting circuit configured to detect power of a load;
an integrated circuit module including two interfaces, each of the two interfaces configured to receive an ON operating command or an OFF operating command from a remote control device; and
a proximity detection circuit configured to determine a proximity of each of the two interfaces to the remote control device,
wherein the integrated circuit module determines a priority between the two interfaces based on the proximity of each of the two interfaces to the remote control device, such that the integrated circuit module receives the ON operating command or the OFF operating command through one of the two interfaces that is closer to the remote control device than the other of the two interfaces, and
wherein the integrated circuit module determines an operating mode of the load according to the power output by the power detecting circuit and outputs an OFF control signal to the power regulator to switch the power regulator into the OFF state in response to the power of the load being within a predetermined range.

2. The standby circuit of claim 1, wherein when the integrated circuit module receives the OFF operating command, the integrated circuit module determines the operating mode of the load based on the power, wherein when the load is in the operating mode, the integrated circuit module delays a first predetermined period of time to output the OFF control signal to the power regulator, wherein when the load is in a STANDBY operating mode, the integrated circuit module outputs the OFF control signal to the power regulator, and wherein when the integrated circuit module receives the ON operating command, the integrated circuit module outputs an ON control signal to the power regulator and the power regulator operates in the ON state.

3. The standby circuit according to claim 2, wherein when the integrated circuit module receives the OFF operating command, the integrated circuit module outputs the OFF control signal and operates in a SLEEP mode and wherein when the integrated circuit module receives the ON operating command, the integrated circuit outputs the ON control signal and operates in a WAKE-UP mode.

4. The standby circuit according to claim 3, wherein the integrated circuit module delays a second predetermined period of time to determine whether the power of the load is larger than an upper bound of the predetermined range when outputting the ON control signal to the power regulator and when the power of the load is less than the upper bound of the predetermined range, the integrated circuit module outputs a warning signal.

5. The standby circuit according to claim 1, wherein the proximity detection circuit includes at least one of a radio proximity detection device, a global positioning satellite (GPS) proximity detection device, a cellular triangulation proximity detection device, and a wireless triangulation proximity detection device.

6. The standby circuit according to claim 5, wherein the integrated circuit module further comprises a third interface, wherein the third interface is connected to an internal send module and wherein the integrated circuit module delays sending a signal through the third interface to a remote commander operating the load.

7. The standby circuit according to claim 1, wherein types of the remote control device include a smartphone, a tablet computer, a personal digital assistant, a smart watch, smart glasses, a laptop computer, a notebook computer or a cellular telephone.

8. The standby circuit according to claim 7, wherein determining the priority between the two interfaces also includes comparing the types of the remote control device.

9. The standby circuit according to claim 1, wherein one of the two interfaces connects an internal receive module and the other of the two interfaces connects an external receive module.

10. The standby circuit according to claim 1, wherein the load also receives the OFF operating command from the remote control device.

11. The standby circuit according to claim 1, further comprising a power source separate from a power source of the load used to provide power to the integrated circuit module.

12. The standby circuit according to claim 1, wherein the standby circuit is provided along an electrical wiring connected to the load.

13. A standby outlet, comprising:
a connecting portion; and
at least one socket unit configured to be coupled to the connecting portion, wherein the at least one socket unit includes:
a plurality of conductors;
a socket; and
a standby circuit including:
a power regulator configured to operate in an ON state and an OFF state;
a power detecting circuit configured to detect power of a load;
an integrated circuit module including two interfaces, each of the two interfaces configured to receive an ON operating command or an OFF operating command from a remote control device; and
a proximity detection circuit configured to determine a proximity of each of the two interfaces to the remote control device,
wherein the integrated circuit module determines a priority between the two interfaces based on the proximity of each of the two interfaces to the remote control device, such that the integrated circuit module receives the ON operating command or the OFF operating command through one of the two interfaces that is closer to the remote control device than the other of the two interfaces, and
wherein the integrated circuit module determines an operating mode of the load according to the power output by the power detecting circuit and outputs an OFF control signal to the power regulator to switch the power regulator into the OFF state in response to the power of the load being within a predetermined range.

14. The standby outlet according to claim 13, wherein the plurality of conductors are coupled to the connecting portion, wherein the standby circuit is arranged between the connecting portion and the plurality of conductors and wherein the power detecting circuit detects the power of the load through the plurality of conductors.

15. The standby outlet according to claim 13, wherein the proximity detection circuit includes at least one of a radio proximity detection device, a global positioning satellite (GPS) proximity detection device, a cellular triangulation proximity detection device, and a wireless triangulation proximity detection device.

16. The standby outlet according to claim 13, wherein types of the remote control device include a smartphone, a tablet computer, a personal digital assistant, a smart watch, smart glasses, a laptop computer, a notebook computer or a cellular telephone.

17. A standby plug, comprising:
a plurality of terminals; and
a standby circuit including:
- a power regulator configured to operate in an ON state and an OFF state;
- a power detecting circuit configured to detect power of a load;
- an integrated circuit module including two interfaces, each of the two interfaces configured to receive an ON operating command or an OFF operating command from a remote control device; and
- a proximity detection circuit configured to determine a proximity of each of the two interfaces to the remote control device, wherein the integrated circuit module determines a priority between the two interfaces based on the proximity of each of the two interfaces to the remote control device, such that the integrated circuit module receives the ON operating command or the OFF operating command through one of the two interfaces that is closer to the remote control device than the other of the two interfaces, and wherein the integrated circuit module determines an operating mode of the load according to the power output by the power detecting circuit and outputs an OFF control signal to the power regulator to switch the power regulator into the OFF state in response to the power of the load being within a predetermined range.

18. The standby plug according to claim 17, wherein the plurality of terminals are coupled between an alternating current (AC) power source and the load and wherein the power detecting circuit detects the power of the load through the plurality of terminals.

19. The standby plug according to claim 17, wherein the plurality of conductors are coupled to the connecting portion, wherein the standby circuit is arranged between the connection portion and the plurality of conductors and wherein the power detecting circuit detects the power of the load through the plurality of conductors.

20. The standby plug according to claim 17, wherein the proximity detection circuit includes at least one of a radio proximity detection device, a global positioning satellite (GPS) proximity detection device, a cellular triangulation proximity detection device, and a wireless triangulation proximity detection device.

* * * * *